Patented Jan. 2, 1934

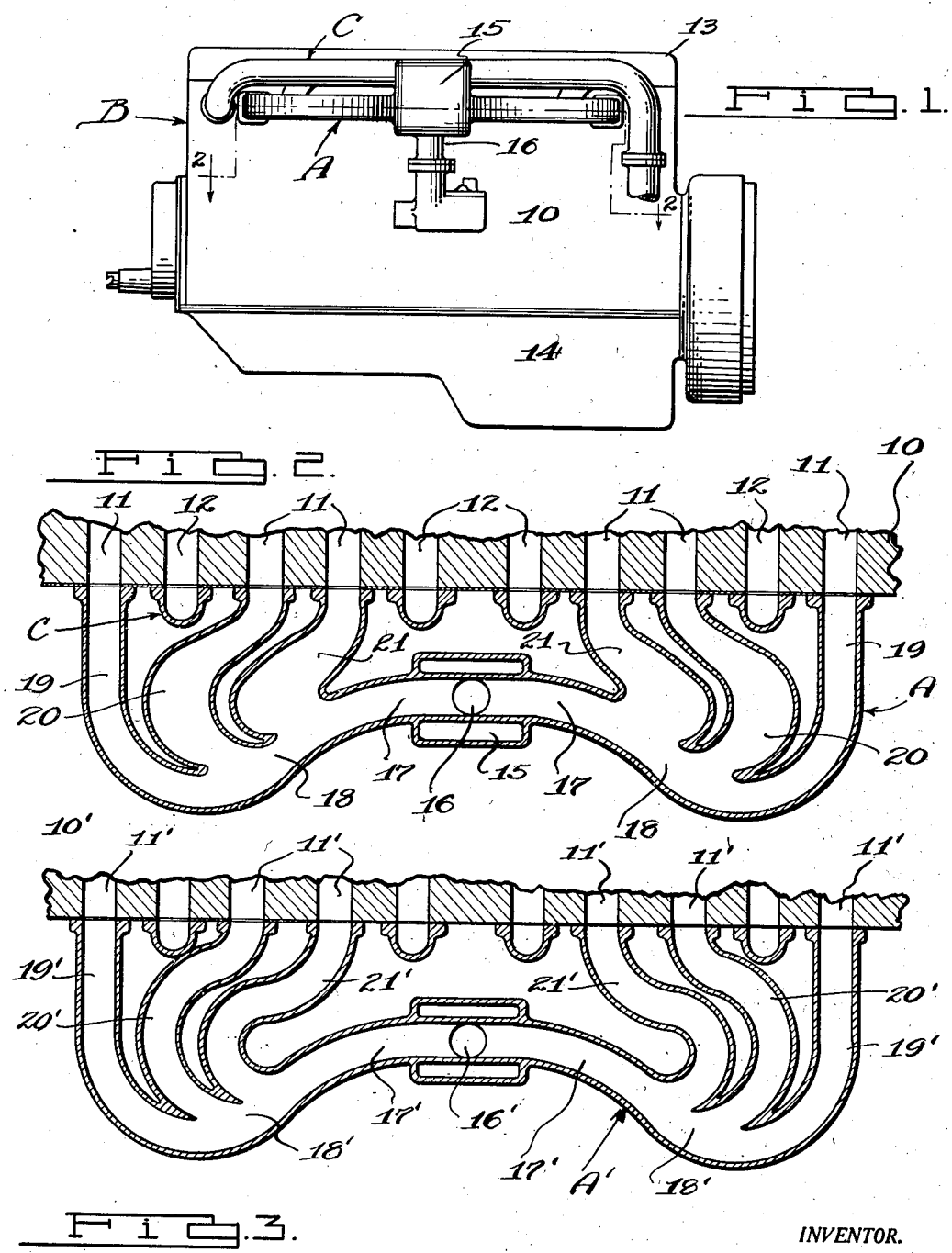

1,942,226

UNITED STATES PATENT OFFICE 1,942,226

ENGINE

Harold H. Timian, Detroit, Mich., assignor to Continental Motors Corporation, Detroit, Mich., a corporation of Virginia Application April 1, 1931. Serial No. 526,842

9 Claims. (Cl. 123—52)

My invention is related to internal combustion engines and is more particularly related to an intake manifold structure adapted for use with an engine of the multi-cylinder type, and to the method of distributing a uniform fuel mixture to a plurality of engine cylinders.

It is the object of my invention to construct an internal combustion engine having generally improved operating characteristics by providing an intake manifold structure constructed to supply a uniform fuel mixture to a plurality of cylinders when the engine is accelerated.

For a more detailed understanding of my invention, reference may be had to the accompanying drawing illustrating preferred embodiments of my invention, and in which:

Figure 1 is a side elevational view of a multi-cylinder engine equipped with an intake manifold structure constructed in accordance with my invention, Figure 2 is a horizontal sectional view thereof taken on the line 2—2 of Figure 1, and Figure 3 is a horizontal sectional view of a modified construction.

"A" designates an intake manifold structure employed with a multi-cylinder internal combustion engine B which includes in general a cylinder block 10 having a plurality of intake and exhaust ports 11 and 12 respectively, and a cylinder head 13 and crankcase 14. An exhaust manifold C is associated therewith and preferably a portion of said exhaust gas is conducted through the heater jacket 15 surrounding a portion of the intake manifold structure in the usual manner.

This intake manifold structure "A" (see Figures 1 and 2) preferably includes a riser portion 16, one or more runner portions 17 and one or more fuel mixture distributing portions 18. The cylinder intake ports are connected with said fuel mixture distributing portions 18 by a plurality of separate branches designated by the reference characters 19, 20 and 21.

It will be observed that these branches are of various lengths as shown in Figure 2 illustrating one embodiment of my invention. In Figure 2 branch 19 is longer than branch 20, which is in turn longer than branch 21. However, the total internal surface area of these branches 19, 20 and 21 are substantially equal for a purpose that will be more apparent hereinafter. The internal areas of these branches 20 and 21 are enlarged to substantially equal the internal area of the longest branch 19 by widening the said branches 20 and 21 as shown. Obviously any suitable means for enlarging the relatively shorter branches will be satisfactory and one other such means is illustrated in Figure 3 wherein a manifold structure A' is provided for accomplishing the same result. This structure includes a riser portion 16', runner portions 17', and fuel distributing portions 18'. Branches 19', 20' and 21' connect the cylinder intake ports 11' of the cylinder structure 10' with the fuel distributing portions. This construction illustrated in Figure 3 provides branches having substantially equal internal surface areas, by providing branches of substantially equal length, some of said branches, and in particular branches 20' and 21', being preferably constructed as shown so as to accommodate said branches within the limited space provided therefor, as the cylinder intake ports are located different distances from said fuel distributing portion associated with said branches 19, 20 and 21.

I have discovered that engines equipped with an intake manifold constructed in accordance with the principle of my invention can be accelerated rapidly and can be idled to a minimum speed without causing the engine to miss fire since all the cylinders receive a uniform charge. At low engine speeds, there are considerable amounts of wet fuel adhering to the inside surface of the manifold branches. On accelerating the engine, this wet fuel is swept into the cylinders and when the branches have unequal internal surface areas, the branches of relatively smaller internal surface area are emptied of the wet fuel prior to the branches of relatively larger internal surface area. Thus, the cylinders connected with the branches of relatively smaller internal surface area receive a leaner charge as soon as the wet fuel is discharged therefrom than those cylinders connected with the branches of relatively larger internal surface area which are still discharging some wet fuel into the cylinders connected therewith. As a result of this condition, the cylinders obtain a non uniform mixture, which causes the engine to miss and jerk during acceleration thereof until such time as all the branches are emptied of this wet fuel. Also, at low engine speeds some of the cylinders tend to receive a richer mixture than other cylinders due to the greater resistance to the flow of wet fuel in the branches having a relatively greater internal surface area since a greater force is necessary to overcome this friction between the film of wet fuel and the internal surface of the manifold branch.

The difficulties as stated above are overcome by utilizing the principle shown in the illustrated embodiments of my invention, wherein the several branches are constructed with substantially equal internal surface area. Thus, an intake manifold structure having branches of substantially equal internal area supply a uniform fuel mixture to all of the engine cylinders at various engine speeds and on accelerating the engine.

It will be apparent to those skilled in the art to which my invention pertains that various modifications and changes may be made therein without departing from the spirit of my invention or from the scope of the appended claims.

What I claim as my invention is:

1. An intake manifold structure for an internal combustion engine including a plurality of branches, one of said branches being longer than another of said branches, said shorter branch having a relatively greater width than the longer branch, whereby to provide branches of substantially equal internal surface area.

2. An intake manifold structure for an internal combustion engine including a plurality of branches, one of said branches being longer than another of said branches and constructed to provide surfaces of substantially equal area adapted to collect fuel precipitates for effecting substantially a predetermined equal fuel distribution during acceleration of the engine.

3. An intake manifold structure for an internal combustion engine including a plurality of branches, one of said branches being longer and narrower than another of said branches and constructed to provide surfaces of substantially equal area adapted to collect fuel precipitates, for effecting substantially a predetermined equal fuel distribution during acceleration of the engine.

4. An intake manifold structure for a multi-cylinder internal combustion engine including a riser portion, a fuel distributing portion, a runner portion intermediate the riser and distributing portions, and branches for connecting the fuel distributing portion with the engine cylinders, some of said branches being longer and more narrow than the others, said branches constructed to provide surfaces of substantially equal area adapted to collect fuel precipitates, whereby to supply uniform fuel mixtures to said cylinders upon accelerating the engine.

5. An intake manifold structure for a multi-cylinder internal combustion engine including a riser portion, a fuel distributing portion, a runner portion intermediate the riser and distributing portions, and branches for connecting the fuel distributing portion with the engine cylinders, said branches constructed to provide surfaces of substantially equal area adapted to collect fuel precipitates to supply uniform fuel mixtures to said cylinders upon accelerating the engine.

6. An intake manifold structure for a multi-cylinder internal combustion engine including a riser portion, a fuel distributing portion, a runner portion intermediate the riser and distributing portions, and branches of unequal length for connecting the fuel distributing portion with the engine cylinders, said branches having substantially flat floors of substantially equal internal surface areas adapted to collect wet fuel precipitate whereby a uniform fuel mixture is supplied to all cylinders upon accelerating the engine.

7. An intake manifold structure for a multi-cylinder internal combustion engine including a riser portion, a fuel distributing portion, a runner portion intermediate the riser and distributing portions, and branches for connecting the fuel distributing portion with the engine cylinders, said branches having outlets positioned different distances from said fuel distributing portion and constructed to provide branches having substantially equal internal surface area whereby a uniform fuel mixture is supplied to all cylinders upon accelerating the engine.

8. An intake manifold structure for a multi-cylinder internal combustion engine including a riser portion, a fuel distributing portion, a runner portion intermediate the riser and distributing portions, and branches of unequal lengths for connecting the fuel distributing portion with the engine cylinders, said branches provided with substantially flat floors of substantially equal area adapted to collect fuel precipitate, the outlets of said branches being positioned at different distances from said fuel distributing portion.

9. An intake manifold structure for a multi-cylinder internal combustion engine including a riser portion, a fuel distributing portion, a runner portion intermediate the riser and distributing portions and branches for connecting the fuel distributing portion with the engine cylinders, said branches having flat floor portions, some of said branches having outlets positioned nearer the fuel distributing portion than others and having a floor portion of relatively greater width to provide said branches with floor surfaces of substantially equal area adapted to collect fuel precipitates whereby to supply uniform fuel mixtures to said cylinders upon accelerating the engine.

HAROLD H. TIMIAN